United States Patent [19]

Saito

[11] Patent Number: 4,491,808
[45] Date of Patent: Jan. 1, 1985

[54] EQUALIZER CIRCUIT FOR USE IN COMMUNICATION UNIT

[75] Inventor: Kazuo Saito, Osaka, Japan

[73] Assignee: Mitsubishi Denki Kabushiki Kaisha, Tokyo, Japan

[21] Appl. No.: 418,164

[22] Filed: Sep. 14, 1982

[30] Foreign Application Priority Data

Nov. 5, 1981 [JP] Japan ................... 56-178551
Nov. 5, 1981 [JP] Japan ................... 56-178552
Nov. 5, 1981 [JP] Japan ................... 56-178567

[51] Int. Cl.³ .................................. H03H 11/06
[52] U.S. Cl. ........................ 333/28 R; 333/81 R; 375/101
[58] Field of Search ............ 333/28 R, 100, 136; 358/905; 375/11, 101; 455/304, 305

[56] References Cited

U.S. PATENT DOCUMENTS 3,551,854 12/1970 Endo et al. ............. 333/28 R
3,609,599 9/1971 Standley ............... 333/28 R
3,737,808 6/1973 Srivastava ........... 333/28 R X
4,071,782 1/1978 Vidovic ............... 333/28 R X Primary Examiner—Paul Gensler
Attorney, Agent, or Firm—Lowe King Price & Becker

[57] ABSTRACT

An equalizer circuit for use in a communication unit comprises a variable amplitude equalizer (VAE) and a variable group delay equalizer (VDE). The variable amplitude equalizer (VAE) is able to vary only an amplitude frequency response continuously without varying a group delay frequency response, while the variable group delay equalizer (VDE) is able to vary only a group delay frequency response continuously without varying an amplitude frequency response, both being able to adjust the amplitude and group delay frequency responses, respectively, in an independent manner. Preferably, the variable group delay equalizer (VDE) includes an amplitude correcting portion and is structured such that amplitude distortion caused in a delay portion can be corrected by a signal from the amplitude correcting portion.

20 Claims, 20 Drawing Figures

FDE

FAE

EQUALIZER CIRCUIT FOR USE IN COMMUNICATION UNIT

BACKGROUND OF THE INVENTION

1. Field of the Invention

The present invention relates to an equalizer circuit for use in a communication unit. More particularly, the present invention relates to an equalizer circuit for use in a TDMA communication system, for example, and for equalizing an amplitude distortion and/or group delay distortion caused in a transmit-receive system.

2. Description of the Prior Art

FIG. 1 is a conceptual drawing showing an example of a TDMA communication which is a background of the present invention. The TDMA communication is used for a satellite communication, for example, which comprises a plurality of earth stations ES, ES', ... and a common communication satellite CS. The earth station ES comprises a transmitting apparatus TRA and a receiving apparatus REA. A signal modulated by a modulator MOD included in the transmitting apparatus TRA is sent through an equalizer EQL, a transmitter TR and an antenna AE toward an antenna AS of the communication satellite CS. The signal is frequency converted and the frequency converted signal is sent to another earth station ES'. Similarly, a signal from the other earth station ES' is received by the antenna AE of the earth station ES through the communication satellite CS and the received signal is provided to the receiving apparatus REA. In the receiving apparatus REA, the received signal passes a receiver RE and an equalizer EQL and is demodulated by a demodulator DEM. It is known that the transmitter TR and the receiver RE in the earth station ES and a receiving and transmitting system in the communication satellite cause an amplitude distortion and/or group delay distortion, respectively. Particularly, a high power amplifier (not shown) included in the communication satellite CS is used in a relatively saturated state due to size, price and stability thereof. As a result, an AM-PM conversion is caused in the high power amplifier, which causes a phase variation as shown in line A in FIG. 2 in which the line B denotes an output level. Such a phase variation becomes a group delay distortion.

The amplitude distortion and group delay distortion are, respectively, equalized for an amplitude frequency response and a group delay frequency response by the equalizer EQL included in the transmitting apparatus TRA and the equalizer EQL included in the receiving apparatus REA. Conventionally, such an equalizer EQL is generally structured to include a fixed amplitude equalizer FAE, a fixed group delay equalizer FDE and a variable equalizer ME, as shown in FIG. 3. Either of the fixed amplitude equalizer FAE and the fixed group delay equalizer FDE or both may be omitted depending on the amount of actual amplitude distortion or group delay distortion.

In the TDMA communication system which is a background of the present invention, it is impossible that once an operation is initiated, the above described amplitude frequency response and group delay frequency response are detected by transmitting and receiving test signals so that an optimum amount of equalization is detected. The reason is that the time period when a single earth station occupies a line is extremely short since such communication system is made in a time divisional manner. Therefore, in case where a new earth station joins such a communication satellite system, it is necessary to seek an optimum point where amplitude distortion and group delay distortion are minimum and thus a bit error rate (BER) is minimum. To this end, a variable equalizer ME as shown in FIG. 3 may be used.

FIG. 4 is a circuit diagram showing an example of a conventional variable equalizer which is a background of the present invention. An input signal inputted to an input terminal 1 branches through a branch circuit 2, a portion of which being applied to an attenuation setting circuit 4 having a coefficient $-a_n$ and the remaining signal being inputted to the next branch circuit 2 through a delay line 3 having a delay amount T. In a similar operation, the respective signals are applied to the respective attenuation setting circuits having respective attenuation amounts. The signals, from the attenuation setting circuits 4, 4, ... are all applied to an adder 5 and thus the synthesized signals are outputted from the adder 5 to an output terminal 6. The attenuation setting circuits 4, 4, ... include polarity reverse. In such a way, the attenuation amounts of the attenuation setting circuits 4, 4, ... are set to $a_0 = 1$ at the center, $+a_1$ and $-a_1$ on the two sides thereof having absolute values which are equal but polarities which are opposite to each other, $+a_2$ and $-a_2$, ..., $+a_n$ and $-a_n$. In such a manner, an amplitude frequency response and group delay frequency response are set through a known transversal filter theory by arbitrarily setting the respective attenuation amounts of the attenuation setting circuits 4, 4, .... More particularly, an optimum point is sought by the variable equalizer ME by varying an amplitude frequency response and group delay frequency response while detecting a bit error rate (BER). Such a transversal filter is described in a book entitled "Data Transmission", William R. Bennet and James R. Davey, published by McGraw-Hill Book Co., 1965, for example.

In the TDMA communication system, the bit error rate is more greatly affected by group delay distortion than by amplitude distortion and thus an operation for seeking such an optimum point is easily made if an optimum equalization amount for the group delay distortion can be set. Nevertheless, a conventional variable equalizer has not been able to vary, for example, only the amplitude or only the group delay since the attenuation amounts of the attenuation setting circuits 4, 4, ... are arbitrarily set. Accordingly, this means that it is difficult to seek an optimum point by a conventional variable equalizer in a TDMA communication system in which the influence of the group delay frequency response is greater than that of the amplitude frequency response. In addition, although attenuation amounts of a conventional variable equalizer determine an amplitude frequency response and group delay frequency response, respectively, how such frequency response characteristics vary when a single attenuation amount varies could not be known without a large number of simulation data since such variation is different depending on other coefficients. For this reason, it can not be easily confirmed how the amplitude and group delay are equalized.

Another variable equalizer as shown in FIG. 5 has been previously proposed by the present applicant, for example. In FIG. 5, an input signal applied from an input terminal 1 is distributed by a distributor 7. The signal distributor 7 distributes a signal into three signals of the same level. A delay line 3 having a delay amount T is interposed in one path for one of the three signals, a delay line 31 having a delay amount 2T is interposed in another path, and a polarity inverter 8 is interposed in the remaining path. The polarity inverter 8 is structured by a known transformer or transistor and the like and shifts a phase of an applied signal by 180°. The signal from the delay line 31 and the signal from the polarity inverter 8 are synthesized by an adder 9 to be applied to a variable attenuation setting circuit 10. The variable attenuation setting circuit 10 comprises a polarity reverse and an output signal therefrom is synthesized with an output signal from the delay line 3 by an adder 11.

Let it be assumed that no attenuation of signal is caused except for the variable attenuation setting circuit 10 and that no time delay is caused except for the delay lines 3 and 31 and the delay of a main signal is used as a reference (zero). Under these assumptions, an output signal B(ω) obtained from the output terminal 6 is represented in the following equation (1).

$$B(\omega) = \cos \omega t - l\cos \omega(t + T) + l\cos \omega(t - T) \quad (1)$$

$$= \sqrt{(1 + 2l^2) - 2l^2 \cos 2\omega T} \times \cos\left\{\omega t - \pi/2 + \tan^{-1}\left(\frac{1}{2l \sin \omega t}\right)\right\}$$

The response characteristic $G_B(\omega)$ of the amplitude with respect to the frequency of the output signal B(ω) and the response characteristic $\tau_B(\omega)$ of the delay amount with respect to the frequency of the output signal B(ω) are provided by the following equations (2) and (3), respectively.

$$G_B(\omega) = 20 \log \sqrt{(1 + 2l^2) - 2l^2 \cos 2\omega T} \quad (2)$$

$$\tau_B(\omega) = -2lT \frac{\cos \omega t}{(1 + 2l^2) - 2l^2 \cos 2\omega t} \quad (3)$$

In the equations, ω is an angular frequency, ω=2πf wherein f is a frequency. Variation of the amplitude frequency response characteristic $G_B(\omega)$ and the group delay frequency response characteristic $\tau_B(\omega)$ where a coefficient l is larger than 0 (l>0), are shown in the FIG. 6. FIG. 6(A) shows an amplitude frequency response and FIG. 6(B) shows a group delay frequency response, wherein the amplitude and delay amount varies in the direction of the arrow when the coefficient l is made larger. More particularly, as shown in FIG. 6, in the FIG. 5 example, the delay amount varies if the coefficient l is varied in the attenuation setting circuit 10. However, even in the FIG. 5 example, the amplitude as well as the delay amount is varied according to the variation of the coefficient l and thus it is extremely difficult to utilize the FIG. 5 example as a variable equalizer in the TDMA communication system.

SUMMARY OF THE INVENTION

Accordingly, a principal object of the present invention is to provide a variable group delay equalizer such that a variation of an amplitude becomes very small even if the delay amount is changed, so that the equalizer can be effectively utilized in a TDMA communication system.

Briefly described, the present invention is directed to a variable group delay equalizer which comprises a delay portion for synthesizing, in a different polarity with respect to each other, a signal of a predetermined time lead and a signal of a predetermined time delay when an absolute delay amount of a main signal circuit is used as a reference, and an amplitude correcting portion for synthesizing a signal of a second predetermined time lead and a signal of a second predetermined time delay with reference to an absolute delay amount of the main signal circuit for producing a signal for amplitude correction, so that a main signal, an output signal from the delay portion and an output signal from the amplitude correcting portion are synthesized, the amplitude of the output from the amplitude correction portion and the amplitude of the output signal from the delay portion being controlled so that the ratio of both amplitudes is continuously constant, whereby an amplitude distortion caused in the delay portion is corrected by a signal from the correcting portion.

In accordance with the present invention, a variable group delay equalizer which is capable of varying a group delay frequency response without varying an amplitude frequency response is obtained. If a plurality of variable attenuation setting circuits is adapted to be ganged with each other, it is easy to adjust such delay amounts. As seen in an embodiment, if the same variable attenuation setting circuits are ganged with each other, a variable group delay equalizer with a very simple circuit structure, but with a very high accuracy can be obtained cheaply.

A preferred embodiment of the present invention is directed to an equalizer circuit for use in a communication apparatus, which is structured by a cascade connection of an amplitude equalizer able to vary only an amplitude frequency response in a continuous manner without varying a group delay frequency response, and a group delay equalizer able to vary only a group delay frequency response in a continuous manner without varying an amplitude frequency response, so that an amplitude frequency response and delay frequency response can be adjusted in an independent manner, respectively.

In accordance with the embodiment, an amplitude distortion and group delay distortions can be independently and continuously equalized and thus the group delay distortions which principally affect a bit error rate in a TDMA communication system, for example, can be easily equalized. In addition, since an amplitude frequency response and group delay frequency response can be independently adjusted, it can be easily confirmed in what condition an amplitude distortion and group delay distortion are equalized and thus reproducible data can be easily obtained without a large number of simulations.

These objects and other objects, features, aspects and advantages of the present invention will become more apparent from the following detailed description of the present invention when taken in conjunction with their accompanying drawings.

DETAILED DESCRIPTION OF THE PREFERRED EMBODIMENTS

Figure 1:
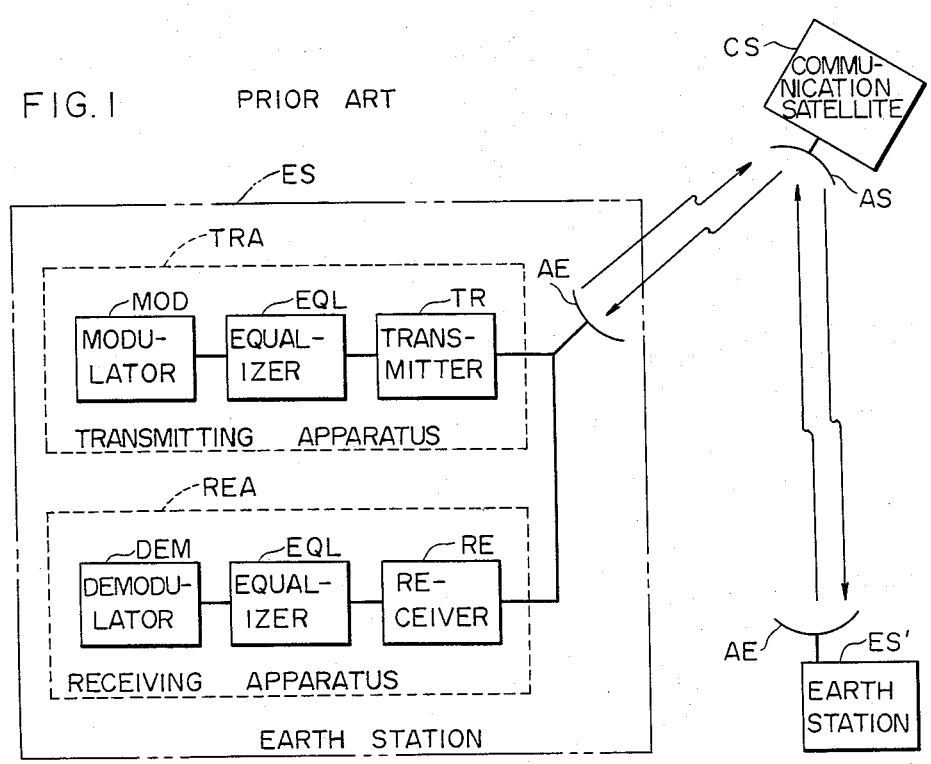
FIG. 1 shows a concept of a TDMA communication system which is a background of the present invention.
Figure 2:
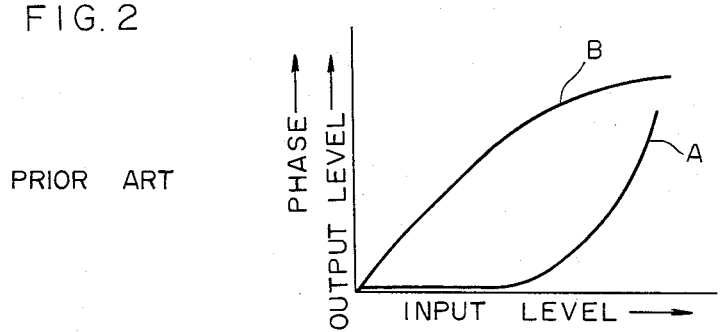
FIG. 2 is a graph showing a characteristic of a high power amplifier included in a communication satellite.
Figure 3:
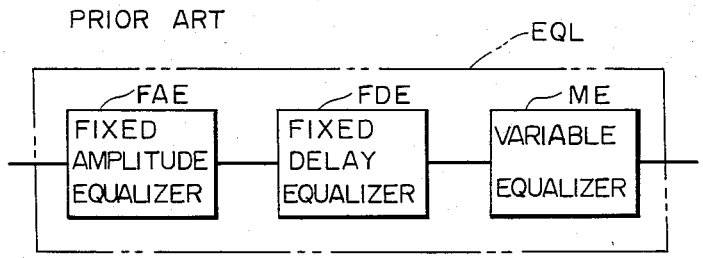
FIG. 3 is a block diagram showing an example of an equalizer for use in a TDMA communication system.
Figure 7:
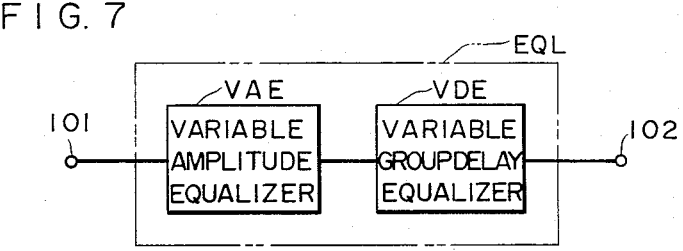
FIG. 7 is a block diagram showing an example of an equalizer for use in a TDMA communication system in accordance with an embodiment of the present invention.

FIG. 7 is a block diagram showing an equalizer circuit for use in a TDMA communication system as an embodiment of the present invention. In FIG. 7, a signal from an input terminal 101 is applied to an output terminal 102 through a variable amplitude equalizer VAE and a variable group delay equalizer VDE which are included in an equalizer circuit EQL. If and when the equalizer EQL is used, for example, in a TDMA communication system as shown in FIG. 1, the input terminal 101 is connected to a modulator and the output terminal 102 is connected to a transmitter in case where the equalizer EQL should be included in a transmitting system, and the input terminal 101 is connected to a receiver and the output terminal 102 is connected to a demodulator in case where the equalizer EQL is included in a receiving system. The variable amplitude equalizer VAE can vary only an amplitude frequency response without varying a group delay frequency response and the variable group delay equalizer VDE can vary only a group delay frequency response without varying an amplitude frequency response. Thus, by connecting two equalizers VAE and VDE in a cascade manner, optimum equalization of an amplitude and group delay becomes possible in an independent manner. Since the use of such an equalizer EQL enables independent respective equalization of amplitude distortion and group delay distortion in the system, it can be known how respective distortions are equalized.

As a matter of course, in the FIG. 7 embodiment, a fixed equalizer may be used as necessary.

Figure 5:
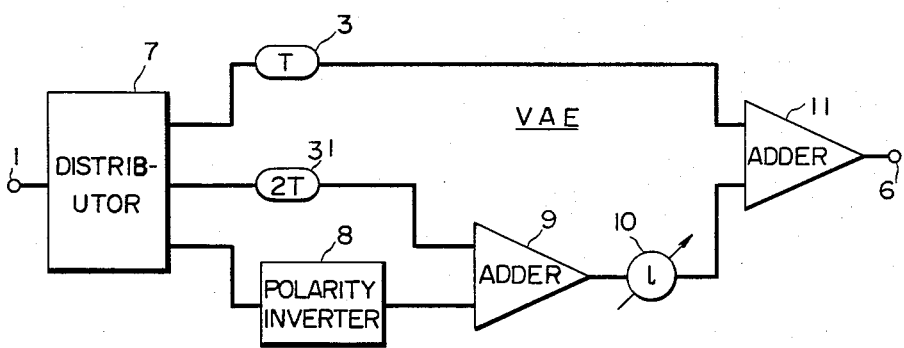
FIG. 5 is a circuit diagram showing another example of a conventional variable equalizer.
Figure 6:
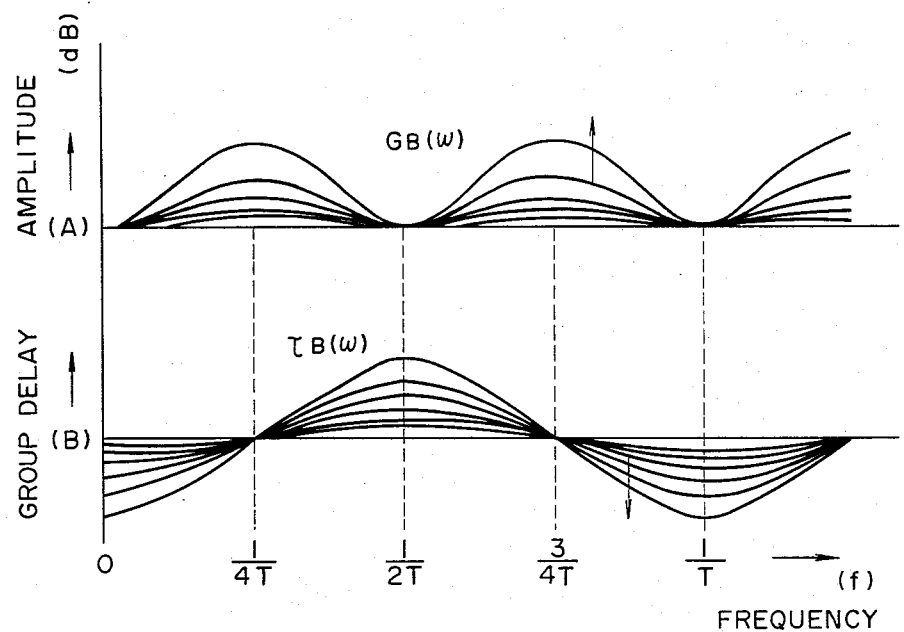
FIG. 6 is a graph of frequency response characteristics of an amplitude and group delay in the example of FIG. 5.
Figure 8:
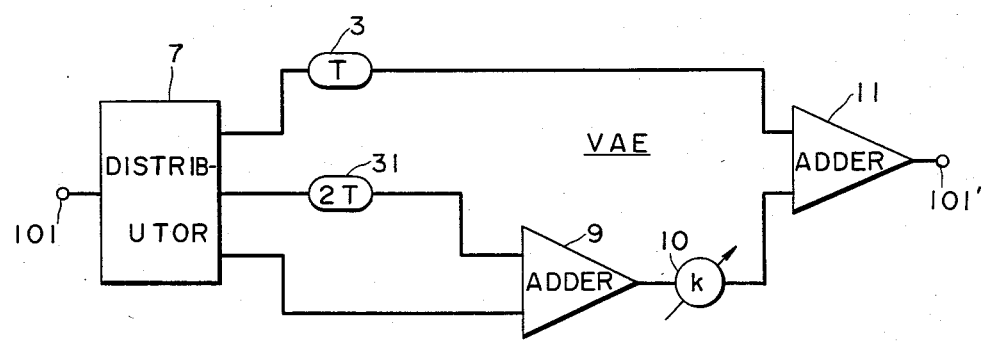
FIG. 8 is a circuit diagram showing an example of a variable amplitude equalizer.

FIG. 8 is a circuit diagram showing one example of a variable amplitude equalizer. The FIG. 8 embodiment is mostly the same as the FIG. 5 embodiment except that a polarity inverter is omitted as compared with the variable equalizer as shown in FIG. 5. More particularly, an input signal from an input terminal 101 is distributed by a distributor 7. A signal which passes through a delay line 31 is synthesized with a signal which does not pass through the delay line by an adder 9 and the thus synthesized signal is applied to an adder 11 through a variable attenuation setting circuit 10 having an attenuation amount or coefficient k. In such a way, the adder 11 synthesizes a main signal passing through the delay line 3 and a subsignal passing through a variable attenuation setting circuit 10 and outputs the synthesized signal to an output terminal 101'. Let it be assumed that no attenuation of signals is caused in any elements other than the attenuation setting circuit 10 and no time delay is caused in elements other than delay lines 3 and 31 and the delay of the main signal is used as a reference which is set to zero. Under these assumptions, an output signal A(ω) withdrawn at the output terminal 101' is given in the following equation (4).

$$A(\omega) = \cos \omega t + k\cos \omega(t + T) + k\cos \omega(t - T) \quad (4)$$
$$= (1 + 2 k\cos \omega T) \cos \omega t$$

Accordingly, the frequency characteristic $G_A(\omega)$ of an amplitude of the output signal A(ω) is given in the following equation (5).

$$G_A(\omega) = 20 \log (1 + 2k\cos \omega T) \quad (5)$$

Figure 9:
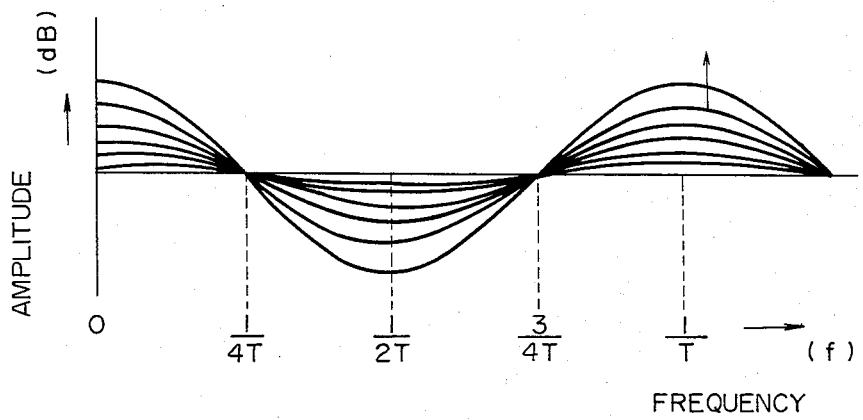
FIG. 9 is a graph showing a frequency response characteristic of an amplitude of the FIG. 8 embodiment.

However, the group delay frequency response characteristic $\tau_A(\omega)$ is flat. A variation for the coefficient k of the amplitude frequency response characteristic $G_A(\omega)$ is shown in FIG. 9. If the coefficient k is made larger, the amplitude varies in the direction of an arrow. More particularly, in the FIG. 8 embodiment, a variable amplitude equalizer VAE which is capable of varying only an amplitude frequency response without varying the group delay frequency response by varying the coefficient k of the variable attenuation setting circuit 10, can be obtained.

Figure 10:
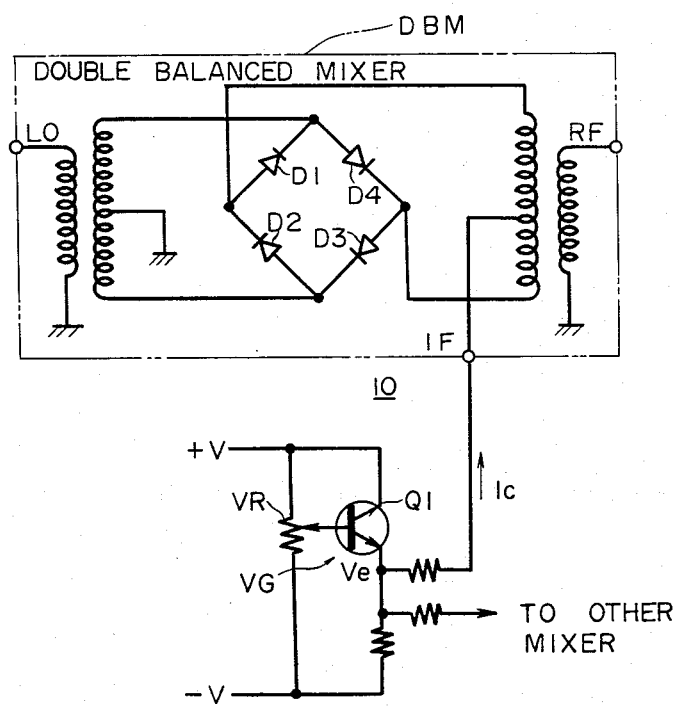
FIG. 10 is a circuit diagram showing an example of a variable attenuation setting circuit.

FIG. 10 is a circuit diagram showing an example of a variable attenuation setting circuit. A variable attenuation setting circuit 10 includes a double balanced mixer DBM and a voltage generator VG for applying a control voltage thereto. The double balanced mixer DBM includes an input terminal LO, an output terminal RF and a control terminal IF. The double balanced mixer DBM comprises a transformer connected to the input terminal LO and a transformer connected to the output terminal RF, and four diodes D1 to D4 connected in a bridge manner between the two transformers. The control voltage generator VG comprises a variable resistor VR and a transistor Q1 to the base of which is applied a voltage from the variable resistor VR. The collector of the transistor Q1 and one end of the variable resistor VR are connected to a power supply +V and the emitter of the transistor Q1 and the other end of the variable resistor VR are connected to a power supply −V. The value of the resistance of the variable resistance VR is changed so that the control current Ic flows from the emitter of the transistor Q1 towards the control terminal IF. An output signal from the adder 9 of FIG. 8, for example, is applied to an input terminal LO of the double balanced mixer DBM and the output terminal RF is connected to an input of the adder 11.

Figure 11:
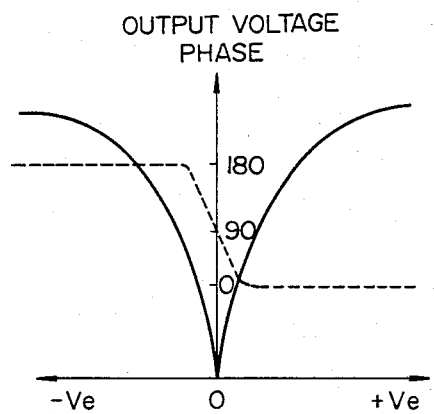
FIG. 11 is a graph explaining an operation of the FIG. 10 embodiment.

Next, referring to FIG. 11, an operation of the variable attenuation setting circuit as shown in FIG. 10 will be described. An emitter voltage Ve of the transistor Q1 is set within the range from +Ve to −Ve by adjusting the variable resistor VR. The voltage Ve causes a control current Ic to flow into the double balanced mixer DBM through the terminal IF, the direction of the current Ic depending on the polarity of the voltage Ve. If and when the polarity of the voltage Ve is plus, the diodes D1 and D3 become conductive and the diodes D2 and D4 are cutoff. Reversely, if and when the polarity of the voltage Ve is minus, the diodes D2 and D4 become conductive and the diodes D1 and D3 are cutoff. If and when the voltage Ve is 0V, all of the diodes D1 to D4 are cutoff. Accordingly, in the range of plus or minus of the voltage Ve, the polarity of a signal is inverted and thus an output is withdrawn from an output terminal RF. The value of the resistance of the diodes D1 to D4 changes depending on the current Ic and thus, as shown in FIG. 11, the amplitude of the output voltage changes according to the change of the voltage Ve. Thus, it should be understood that the variable attenuation setting circuit as shown in FIG. 10 inverts the polarity of a signal passing therethrough as well as varies the amplitude thereof.

Figure 12:
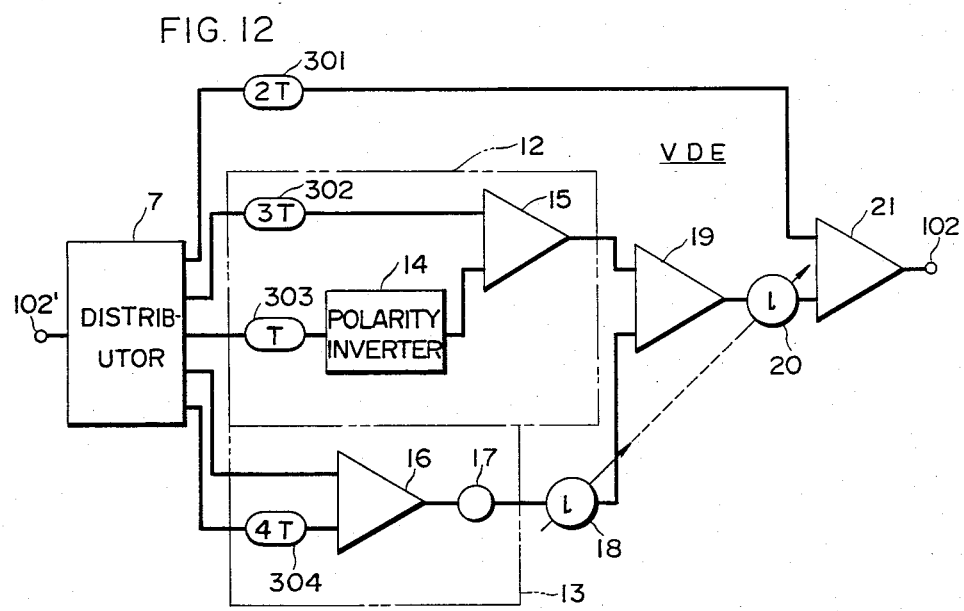
FIG. 12 is a circuit diagram showing an example of a variable group delay equalizer.

FIG. 12 is a circuit diagram showing an example of a variable group delay equalizer as an embodiment of the present invention. The variable group delay equalizer VDE comprises an input terminal 102' and an output terminal 102, the input terminal 102' being connected to, for example, an output terminal 101' as shown in FIG. 8. The output terminal 102 is connected to, for example, the transmitter TR or the demodulator DEM (FIG. 1). The input terminal 102' is connected to the distributor 7 and thus an input signal is distributed by the distributor 7 into a necessary number of signals (in this embodiment, the number is 5). Two of these five signals are applied to a delay circuit 12 and other two signals are applied to a correcting circuit 13. The remaining one signal is applied to an adder 21 through a delay line 301 having a delay amount 2T. The two signals applied to the delay circuit 12 are delayed by the delay lines 302 and 303 having delay amounts 3T and T, respectively, so that a signal of time leading of T and a signal of time delay of T are obtained with respect to the reference which is an absolute delay amount (2T, in this example) of a main signal circuit, that is, the delay line 301. An output signal from the delay line 302 is a signal having a time delay T with respect to a main signal and an output signal from the delay line 303 is a signal having a lead time T with respect to the main signal. The output signal from the delay line 303 is applied to an adder 15 through a known polarity inverter 14, together with the output signal from the delay line 302. Thus, in the delay circuit 12, signals of a predetermined time lead T and time delay T with respect to the reference of the absolute delay amount of the main signal, are synthesized in the same level but different polarity and the synthesized signal is applied to an adder 19. On the other hand, one of two signals from the distributor 7 to the correcting circuit 13 is directly applied to an adder 16 and the other is also applied to the adder 16 through a delay line 304 having a delay amount 4T. Accordingly, in the correcting circuit 13, signals of a predetermined time lead 2T and time delay 2T with respect to the reference of the absolute delay amount of the main signal, are synthesized in the same level by the adder 16. An output signal from the adder 16 is applied to a variable attenuation setting circuit 18 through a known fixed attenuator 17. The variable attenuating setting circuit 18 has an attenuation amount or coefficient l, an output signal from the circuit 18 being applied to the adder 19. Thus, the adder 19 synthesizes the output signal from the delay circuit 12 and the output signal from the correcting circuit 13 and applies the synthesized output to adder 21 of the final stage through a variable attenuation setting circuit 20. The variable attenuation setting circuit 20 is ganged with the above described variable attenuation setting circuit 18. More specifically, these variable attenuation setting circuits 18 and 20 comprise a double balanced mixer as shown in FIG. 10 and are controlled by the same voltage Ve from the voltage generator VG (FIG. 10). Therefore, in this embodiment, it is possible to vary the coefficients l of two attenuation setting circuits 18 and 20 in a ganged manner simply by varying the value of resistance of the variable resistor VR (FIG. 10).

The main signal circuit and the amplitude correcting circuit 13 are the same as the variable amplitude equalizer VAE as shown in FIG. 8 and, assuming that the delay circuit 12 is not provided, only an amplitude frequency response varies, without variation of the group delay frequency response, by varying the coefficient l of the variable attenuation setting circuit 18. A period of repetition of amplitude variation in the correcting circuit 13 is ½T. On the other hand, assuming that the correcting circuit 13 is not provided, a period of the repetition of amplitude variation is ¼T. Then, in the FIG. 12 embodiment, a period of the repetition of amplitude frequency response of the correcting circuit 13 and that in the delay circuit 12 are made to be the same so that the amplitude variation in the delay circuit 12 is canceled by the output signal from the correcting circuit 13, which results in an extremely small amplitude variation.

Assuming that no attenuation of signal is caused in any elements other than the variable attenuation setting circuits 18 and 20 and the fixed attenuator 17 and no time delay is caused in any elements other than the respective delay lines, and let it be assumed that the coefficient of the variable attenuation setting circuit 20 is l, and the coefficients of circuits including the fixed attenuator 17 and the variable attenuation setting circuit 18 and 20 are k, then a signal $C(\omega)$ obtained from the output terminal 102 is given in the following equation (6).

$$C(\omega) = \cos \omega t - l\cos \omega(t + T) + l\cos \omega(t - T) + \quad (6)$$

$$k\cos \omega(t - 2T) + k\cos \omega(t + 2T)$$

$$= \sqrt{(1 + 2l^2) + 2(2k - l^2) \cos 2\omega T + 4k^2 \cos^2 2\omega T} \times$$

$$\sin \frac{\omega t + \tan^{-1} \cdot (1 + 2k \cos \omega t)}{2l \sin \omega T}$$

As a result, an amplitude frequency response characteristic $Gc(\omega)$ of the output signal $C(\omega)$ is given in the following equation (7).

$$Gc(\omega) = 20 \log \sqrt{(1 + 2l^2) + 2(2k - l^2) \cos 2\omega T + 4k^2 \cos^2 2\omega T} \quad (7)$$

The variable attenuation setting circuits 18 and 20 are ganged with each other and have the same coefficient l. Let it be assumed that the fixed attenuator 17 has an attenuator amount 6 dB, that is, the attenuation coefficient is 0.5, then the whole coefficient k is given in the following equation (8).

$$k = 0.5 \times l \times l = l^2/2 \quad (8)$$

Substituting the above described equation (8) for the equation (7), the second term within the root sign becomes 0 and thus the above described equation (7) is given in the following equation (9).

$$Gc(\omega) = 20 \log \sqrt{(1 + 2l^2) + l^4 \cos^2 2\omega T} \quad (9)$$

Comparing the above described equation (9) with the previous equation (2), the term in which an amplitude varies with respect to a frequency is $2l^2 \cos 2\omega T$ in the equation (2) whereas it is $1^4 \cos^2 2\omega T$ in the equation (9) which becomes very small in the range of the coefficient $l < 1$. On the other hand, the group delay frequency response characteristic $\tau_c(\omega)$ at this time is given in the following equation (10).

$$\tau_c(\omega) = -2Tl \frac{l^2 \sin 2 \omega T \cdot \sin \omega T + (l^2 + 1) \cos \omega T}{1 + 2l^2 + l^4 \cos^2 2\omega T} \quad (10)$$

Figure 13:
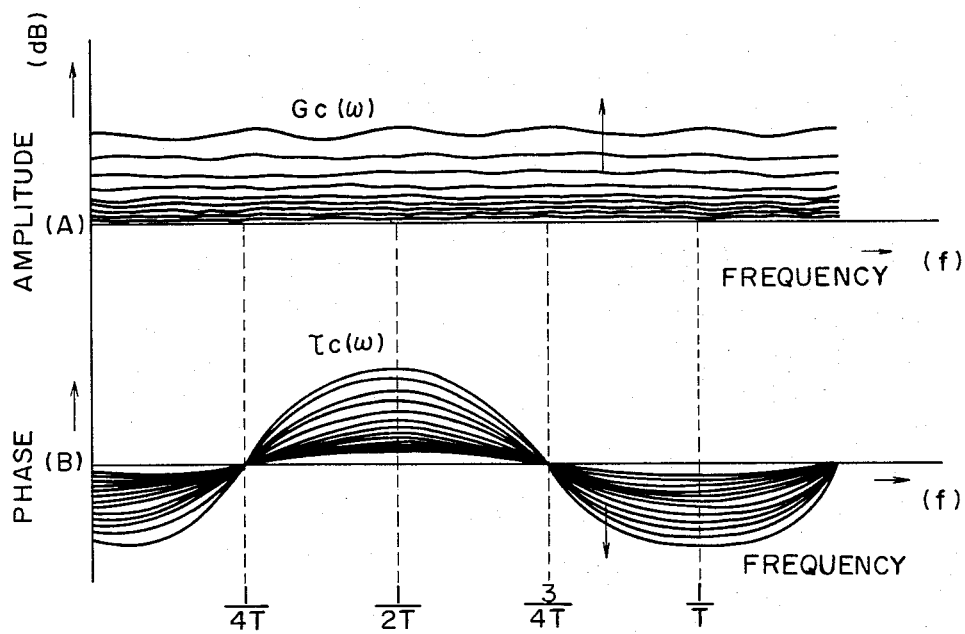
FIG. 13 is a graph showing respective frequency response characteristics of an amplitude and group delay of the FIG. 12 embodiment.

The variation characteristics to the coefficient l of the amplitude frequency response characteristic $Gc(\omega)$ and the group delay frequency response characteristic $\tau_c(\omega)$ are shown in FIG. 13. FIG. 13(A) indicates an amplitude frequency response characteristic and FIG. 13(B) indicates a group delay frequency response characteristic. As seen from FIG. 13, if the coefficients l of both variable attenuation setting circuit 18 and 20 are made larger, the amplitude and the delay amount vary, respectively, in the direction of the arrow . It can be seen from FIG. 13 that the delay amount can be varied by varying the coefficient l while the amplitude is hardly varied irrespective of varying of the coefficient l.

Although we assumed that no attenuation of signal is caused in all elements other than the variable attenuation setting circuit and the fixed attenuator, the above described equation (12) is established irrespective of an absolute amount of attenuation. Also, irrespective of an absolute time delay, the equation (12) is established.

Figure 14:
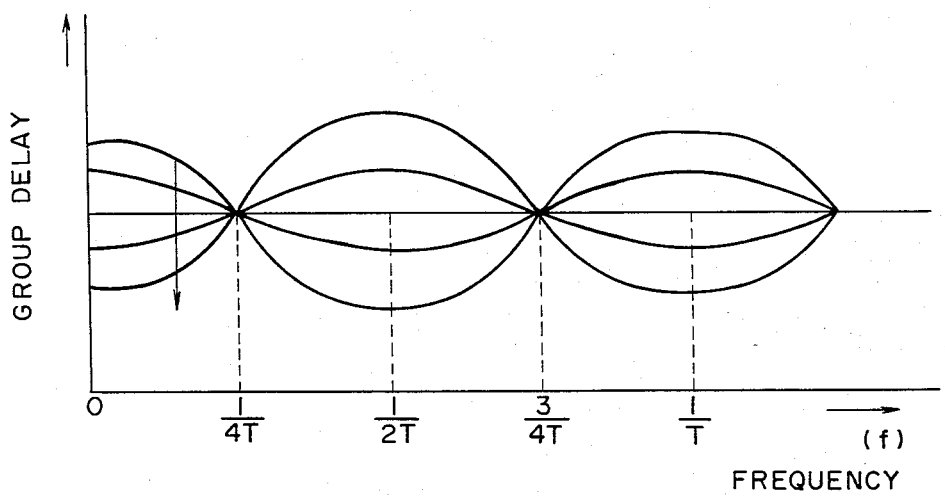
FIG. 14 is another graph showing a frequency response characteristic of a group delay.

The graph of FIG. 13 shows an amplitude variation and a delay amount variation in case of the coefficient l>0. In the range of coefficient l<0, the sign of the above described equation (10) is reversed and thus the lead and lag of the delay amount are reversed with respect to the reference. However, the above described equation (10) is not reversed if the absolute value of the coefficient l is equal even in case of the coefficient l<0. More particularly, if and when the coefficient l changes from plus to minus, the delay amount reverses and changes as shown in FIG. 14, but the amplitude simply repeats the variation such as in FIG. 13(A). Thus it will be understood that the FIG. 12 embodiment can vary only the group delay frequency response without any amplitude variation. Accordingly, since, if such a variable group delay equalizer VDE is employed as a variable equalizer in the TDMA communication system, deterioration of a bit error rate due only to group delay distortions can be independently equalized, and an operation for seeking an optimum point is extremely readily preferred as compared with a conventional case where an amplitude frequency response and a group delay frequency response change together. Amounts of equalization to the respective amplitude distortion and the delay distortion can be surely grasped and thus reproducible data can be obtained, without a number of simulations, by utilizing such a variable group delay equalizer and a variable amplitude equalizer.

Figure 15:
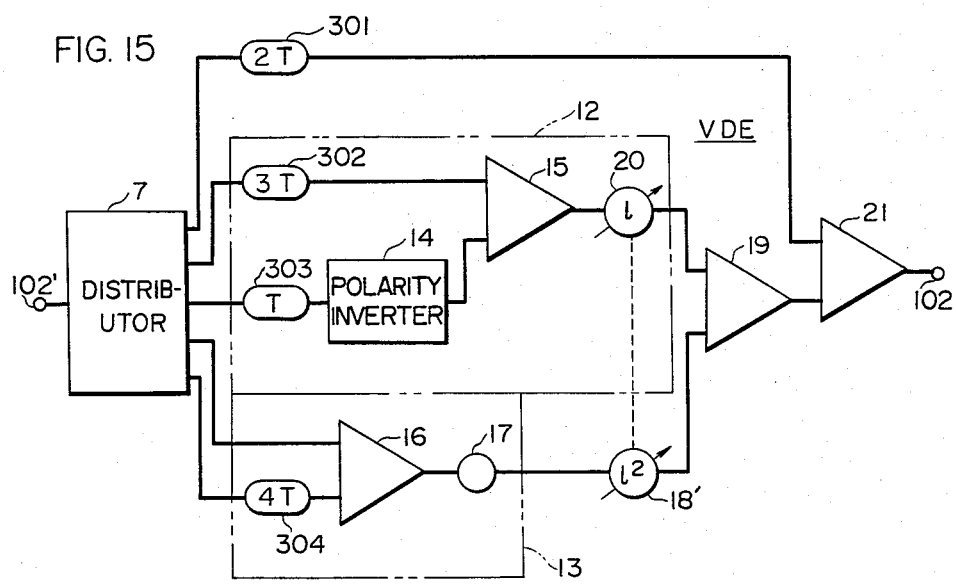
FIG. 15 is a circuit showing other example of a variable group delay equalizer.

FIG. 15 is a circuit diagram showing another embodiment of the present invention. In FIG. 15, as compared with the FIG. 12 embodiment, the position where a variable attenuation setting circuit 20 is inserted is changed and correspondingly, a coefficient of a variable attenuation setting circuit 18' is changed. More particularly, although, in the FIG. 12 embodiment, the variable attenuation setting circuit 20 is connected as a subsequent stage of the adder 19, the variable attenuation setting circuit 20 can be interposed between the adders 15 and 19, as shown in FIG. 15, if the coefficient of the variable attenuation setting circuit 18' is squared to be $l^2$. In principle, two variable attenuation setting circuits may be ganged with each other so that an amplitude of an output signal from the correcting circuit 13 is multiplied by the square of an amplitude multiplier of the output signal from the delay circuit 12, that is, is attenuated by twice the attenuation in terms of a decibel scale.

Figure 4:
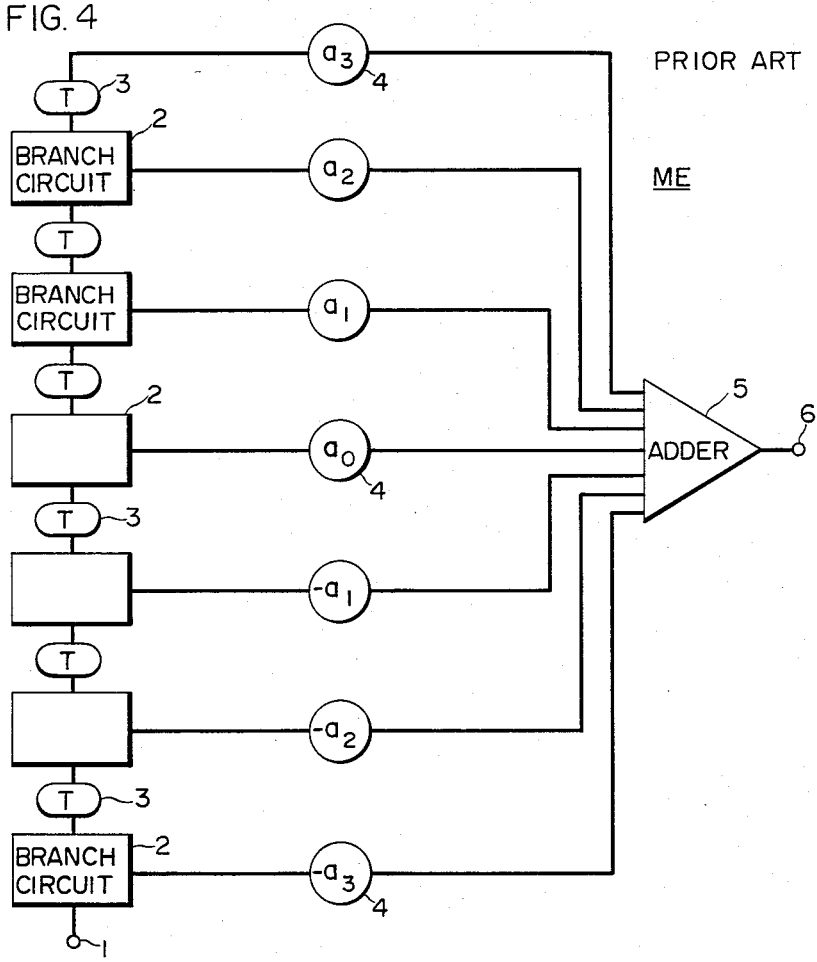
FIG. 4 is a circuit diagram showing an example of a conventional variable equalizer.
Figure 16:
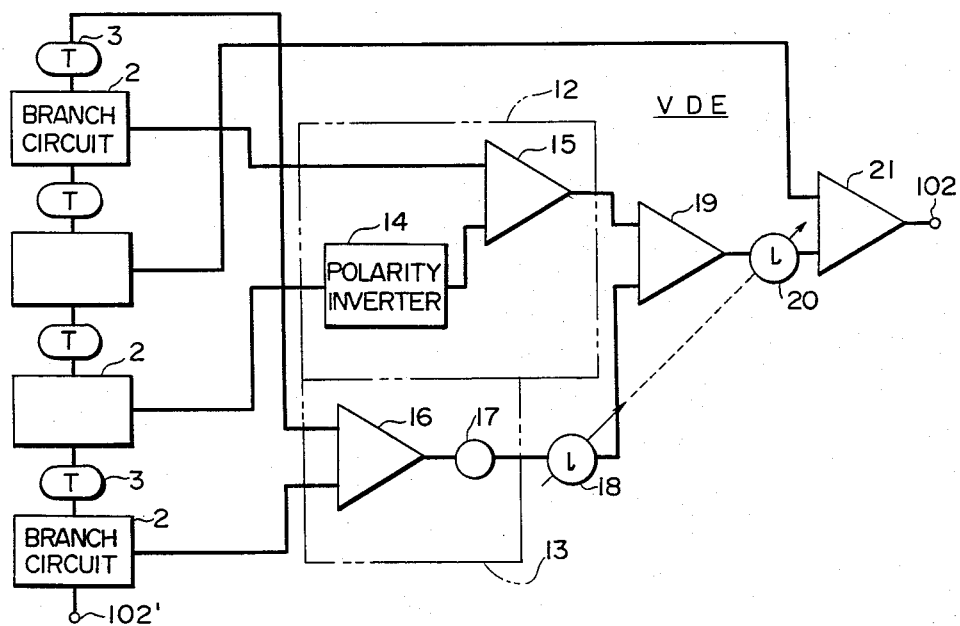
FIG. 16 is a circuit showing a further example of a variable group delay equalizer.

FIG. 16 is a circuit diagram showing another embodiment of the present invention. The FIG. 16 embodiment is the same as the FIG. 12 embodiment except that combination of a conventional branch circuit and delay line as shown in FIG. 4 is used as a signal withdrawing means.

Figure 17:
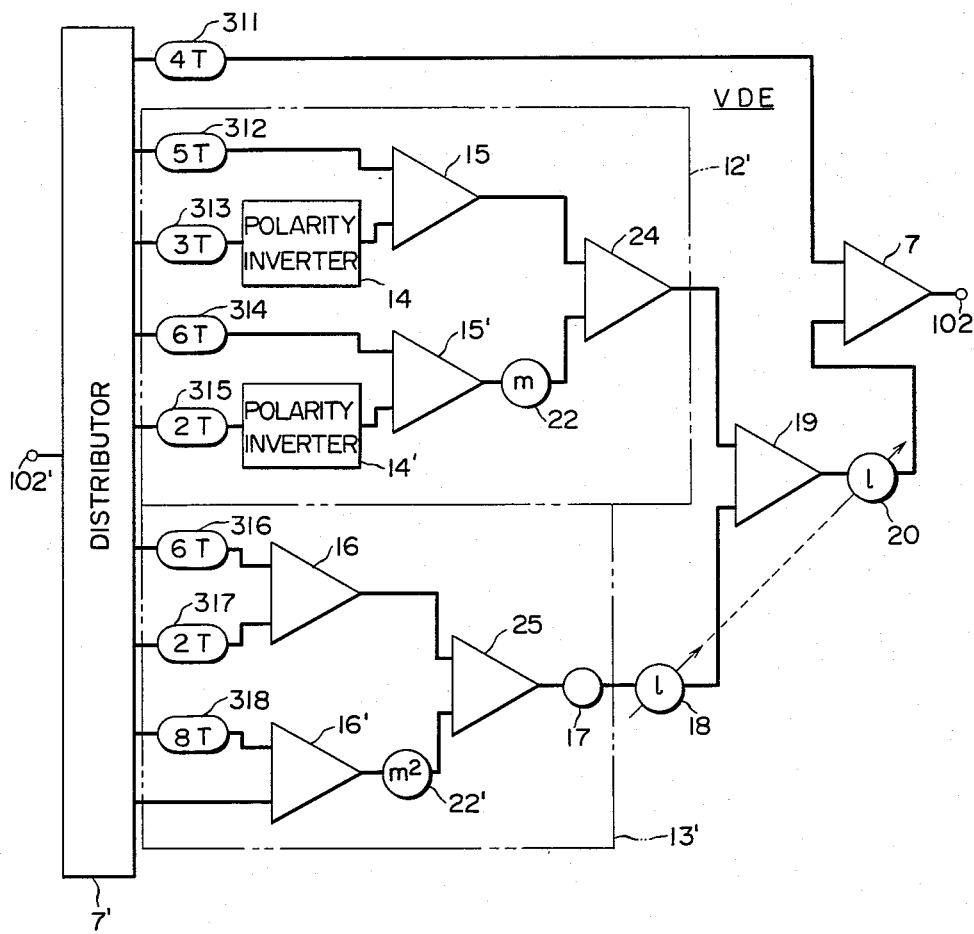
FIG. 17 is a circuit diagram showing a still further example of a variable group delay equalizer.

FIG. 17 is a circuit diagram showing another embodiment of the present invention. The FIG. 17 embodiment is structured such that a delay circuit and a correcting circuit comprise a plurality of set of signal paths, respectively. More particularly, the adders 15 and 15' in the delay circuit 12 are combined so that they correspond to the adders 16 and 16' in the correcting circuit 13', respectively. An output signal of the adder 15' is attenuated by a fixed attenuator 22 and an output signal from the adder 16' is attenuated by a fixed attenuator 22'. The fixed attenuators 22 and 22' have coefficients m and $m^2$, respectively. If and when a delay amount which is different from the variable delay amount in the combination of the adder 15 and 16 is required, the amplitude variation of a signal passing through the adder 15' is canceled by an amplitude variation of a signal passing through the adder 16', by setting such coefficients m and $m^2$, and consequently, only the delay amount of the signal obtained at the output terminal 102 can be changed by varying the coefficients l of the variable attenuation setting circuits 18 and 20 is a ganged manner.

Meanwhile, in the above described embodiments, a double balanced mixer is used as one example of a variable attenuation setting circuit. However, it will be readily understood by those skilled in the art that such variable attenuation setting circuit can be achieved by other circuit structures.

In addition, in the FIGS. 12, 15, 16 and 17 embodiments, a 180° phase shifter is used as the polarity inverters 14, 14'. However, as such polarity inverter, a 180° synthesizer and 90° distributor may be used. For example, in the FIG. 12 embodiment, if and when a 180° synthesizer is substituted for the adder 15 and a 90° distributor or synthesizer is substituted for the portion sending a signal to the delay circuit of the adder 15 and the distributor 7, the same result can be obtained. In essence, for example, in the FIG. 12 embodiment, two signals applied to the adder 15 must be eventually different in their polarities from each other.

Similarly, separate polarity inverters may be used as a variable attenuation setting circuits 18 (or 18') and 20, without including a polarity reversal. The circuits 18 (18') and 20 must be ganged with each other so that their respective amplitudes of the output signal from the delay circuit 12 and the output signal from the correcting circuit 13 eventually attain constant ratio and the position to be inserted and the coefficients may be arbitrarily selected as long as such requirement is satisfied. For example, in the FIG. 12 embodiment, a variable attenuation setting circuit having a predetermined coefficient or attenuation amount may be ganged with each other and disposed in the respective signal paths provided in the delay circuit 12 and the correcting circuit 13.

Although the TDMA communication system has been described as one example of utilization of the variable group delay equalizer, as a matter of course, such a variable group delay equalizer can be used in an FDM communication system and the like.

Figure 18:
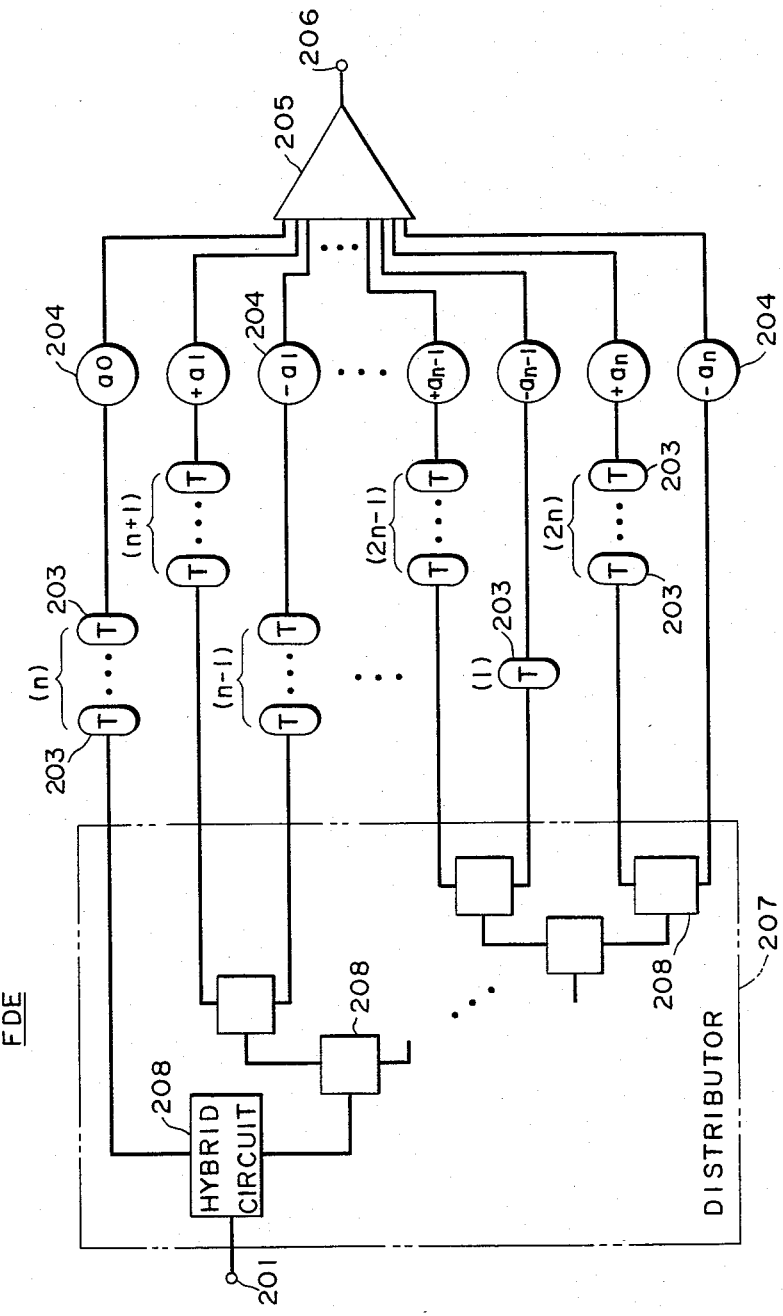
FIG. 18 is a circuit diagram showing a group delay equalizer as an example of the present invention.

FIG. 18 is a circuit diagram showing a preferred example of a group delay equalizer which is able to be utilized in one embodiment of the present invention. In FIG. 18, an input signal inputted into an input terminal 201 is applied to a distributor 207. The distributor 207 is comprised of a combination of hybrid circuit 208, 208, ... which divide a signal into two in the same level. An input signal is applied to a necessary number of signal lines by the distributor 207. In the respective signal lines, 0 to 2n delay lines having a delay amount T, respectively are interposed. In each signal line, attenuation setting circuits 204, 204, ... having coefficients $a_0$, $+a_1$ and $-a_1$, ..., $+a_n$ and $-a_n$ are interposed. In the FIG. 18 embodiment, since the distributor 207 is structured by a stack of hybrid circuits 208, the same level signals can be applied to the attenuation setting circuit 204 having a coefficient $+a_1$ and the attenuation setting circuit 204 having a coefficient $-a_1$. Similarly, the same level signals can be applied to the attenuation setting circuit 204 having a coefficient $+a_n$ and the attenuation setting circuit 204 having the coefficient $-a_n$. A circuit having the same characteristic as a known group delay equalizer can be obtained by properly setting coefficients $a_0$ to $a_n$ in the attenuation setting circuits 204, 204, ....

More particularly, letting a coefficient $a_1=1$, an amplitude frequency response characteristic $G(\omega)$ and a group delay frequency response characteristic $\tau(\omega)$ of an output signal obtained at the output terminal 206 are given in the following equations (11) and (12).

$$G(\omega) = 20 \log \sqrt{1 + 4l^2 \sin^2 \omega t} \quad (11)$$

$$\tau(\omega) = -2lT \cdot \frac{\cos \omega t}{(1 + 2l^2) - 2l^2 \cos \omega t} \quad (12)$$

If the coefficient l is a small value, $G(\omega) \approx 1$, which indicates that the frequency characteristic of the amplitude is flat. Accordingly, as is well known, the delay characteristic $\tau(\omega)$ can be changed by varying the coefficient l.

A conventional equalizer as shown in FIG. 4 requires a correcting means since the levels of signals inputted into the attenuation setting circuit are different.

More particularly, at very high frequencies, an insertion loss is caused in an actual circuit since a distributor, a directional coupler and the like are used as a branch circuit. Accordingly, level difference is caused in a signal applied to each attenuation setting circuit, which difference is proportional to the number of the branch circuits which are provided in the path thereto and thus the level difference of signals between attenuation setting circuits which should be the same signal level. For this reason, conventionally, such level difference was corrected until the level difference reaches an adder, for example, by using a fixed attenuator or an amplifier. Thus, a conventional apparatus necessarily requires means for correcting a signal level difference caused due to the difference of insertion loss. Therefore, there are some defects in that a structure of a circuit of an equalizer becomes large sized and expensive as well as becoming complicated. However, in accordance with the present embodiment, such correcting means can be omitted because a distributor ratio in distributor 207 can be adequately set. In addition, in accordance with the present embodiment, influence due to a frequency characteristic of an amplitude can be largely reduced. More particularly, in a conventional apparatus in FIG. 4, in case where the branch circuits 2, 2, ... have a frequency characteristic of an amplitude, a main signal, that is, a signal passing through an attenuation setting circuit having a coefficient $a_0$, comes to have a frequency characteristic of an amplitude depending on frequency characteristics of the branch circuits through which the signal passes thereto. On the other hand, the level of the main signal is the largest as compared with other signals and consequently, such frequency characteristic of amplitude of the branch circuits largely affects a frequency response characteristic of an output signal outputted from the output terminal 6. Over against this, in accordance with the FIG. 18 embodiment, there are no accumulative influences of a frequency characteristic of the branch circuits and thus influence of the branch circuits to the frequency response characteristic of the output signal are largely reduced.

Figure 19:
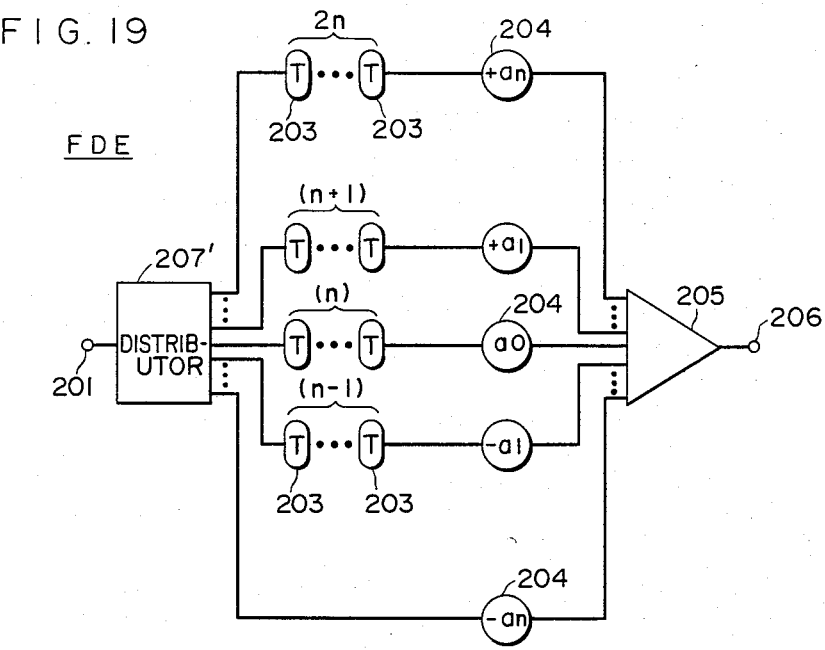
FIG. 19 is a circuit diagram showing another example of a group delay equalizer as an embodiment of the present invention.

FIG. 19 is a circuit diagram showing another example of a group delay equalizer as one embodiment of the present invention. In the FIG. 19 embodiment, a signal distributor 207' distributes an applied input signal to signals of the same level. Although a combination of hybrid circuits as shown in FIG. 18 can be used as the distributor 207', other structure may be used. Even in the FIG. 19 embodiment, all of the distributed output levels of the distributor 207' can be made to be the same and thus correcting means which was required in the prior art is not required.

Figure 20:
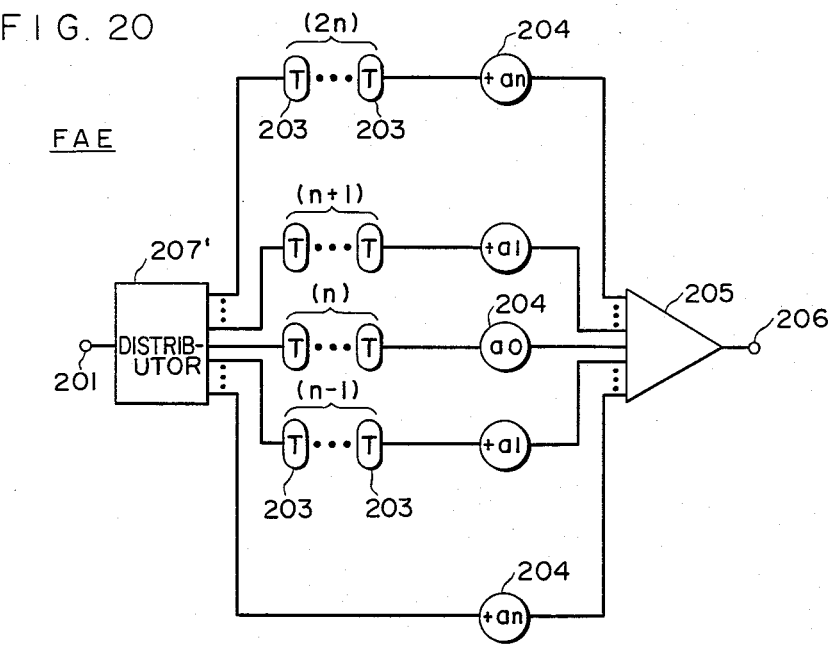
FIG. 20 is a circuit diagram showing an example of an amplitude equalizer as another embodiment of the present invention.

FIG. 20 is a circuit diagram showing an amplitude equalizer as another embodiment of the present invention. Since, as described in the foregoing, an amplitude equalizer is different from a group delay equalizer only in polarity of a signal, the detailed description may be omitted here. Even in the FIG. 20 embodiment, the level correcting means can be eliminated, just as in the FIG. 19 embodiment.

It will be easily understood from the above described embodiments, that, in all of the above described embodiments, a variable group delay equalizer or a variable amplitude equalizer can be obtained, respectively, by making each attenuation setting circuit variable. As further described in the foregoing, a known double balanced mixer is available as such a variable attenuation setting circuit. As further described in the foregoing, in accordance with these embodiments of the present invention, means for correcting a level difference due to an insertion loss, which was conventionally required, can be omitted, since a signal level to each branch signal line can be arbitrarily set by a signal distributor means.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A variable group delay equalizer comprising:
 a signal inputting portion, and
 signal withdrawing means for distributing and delaying an input signal from said signal inputting portion for withdrawing at least a main signal and first, second, third and fourth signals,
 said first and second signals having a time lead and a time delay, respectively, of a first predetermined time period with respect to a reference corresponding to an absolute delay amount of said main signal, and having substantially identical signal levels,
 said third and fourth signals having a time lead and a time delay of a second predetermined time period with respect to a reference corresponding to an absolute delay amount of said main signal,
 polarity inverting means for rendering said first and second signals different in polarity,
 first synthesizing means for synthesizing said first and second signals having said different polarities and the same signal levels,
 correcting signal producing means for synthesizing said third and fourth signals at substantially the same signal level for outputting an amplitude correcting signal,
 amplitude varying means for varying an output signal from said first synthesizing means and an output signal from said correcting signal producing means so that a predetermined amplitude ratio is obtained,
 means included within the equalizer for reversing a polarity of an output signal from said first synthesizing means, and
 second synthesizing means for synthesizing, with said main signal, an output signal from said first synthesizing means and an output signal from said correcting signal producing means having polarities which are different from each other and which have a predetermined amplitude ratio.

2. A variable group delay equalizer in accordance with claim 1, wherein said correcting signal producing means comprises
 adder means for synthesizing said third and fourth signals of the same level, and
 fixed attenuator means for attenuating by a predetermined amount an output signal from said adder means.

3. A variable group delay equalizer in accordance with claims 1 or 2, wherein said second predetermined time period is selected to be two times said first predetermined time period.

4. A variable group delay equalizer in accordance with claim 3, wherein said amplitude varying means comprises amplitude adjusting means for attenuating an amplitude of an output signal from said correcting signal producing means by a factor substantially equalling a square of an amplitude attenuating factor used in attenuating an amplitude of an output signal from said first synthesizing means.

5. A variable group delay equalizer in accordance with claim 4, wherein said amplitude adjusting means comprises at least two variable attenuation setting circuits which are interposed in a signal path affecting an amplitude of an output signal from said first synthesizing means and a signal path affecting an amplitude of an output signal from said correcting signal producing means and which are ganged with each other.

6. A variable group delay equalizer in accordance with claim 5, wherein said second synthesizing means comprises
 a first adder for synthesizing an output signal from said first synthesizing means and an output signal from said correcting signal producing means, and
 a second adder for synthesizing said main signal and an output signal from said first adder.

7. A variable group delay equalizer in accordance with claim 6, wherein said amplitude adjusting means comprises
 a first variable attenuation setting circuit interposed between said correcting signal producing means and said first adder, and
 a second variable attenuation setting circuit interposed between said first adder and said second adder and ganged with said first variable attenuation setting circuit.

8. A variable group delay equalizer in accordance with claim 7, wherein said means for reversing polarity of an output signal is included in said second variable attenuation setting circuit.

9. A variable group delay equalizer in accordance with claim 6, wherein said amplitude adjusting means includes
 a first variable attentuation setting circuit being interposed between said first synthesizing means and said first adder, and
 a second variable attenuation setting circuit being interposed between said correcting signal producing means and said first adder and ganged with said first variable attenuation setting circuit, the second variable attenuation setting circuit having a coefficient of attenuation substantially equal to a square (two times in terms of a decibel scale) of a coefficient of attenuation of said first variable attenuation setting circuit.

10. A variable group delay equalizer in accordance with claim 9, wherein said means for reversing polarity of an output signal is included in the second variable attenuation setting circuit.

11. A variable group delay equalizer in accordance with claim 6, wherein said amplitude adjusting means comprises a plurality of variable attenuation setting circuits being interposed in the respective paths of said first through fourth signals and being ganged with each other.

12. A variable group delay equalizer in accordance with claim 1, wherein said signal withdrawing means comprises a distributing circuit for distributing an input signal from said signal inputting portion into at least said five signals, and delay circuit being interposed in signal paths from said distributing circuit.

13. A variable group delay equalizer in accordance with claim 12, wherein said polarity inverting means comprises at least one polarity inverter interposed between at least one of said delay circuits and said first synthesizing means, in either of said first signal path and said second signal path.

14. A variable group delay equalizer in accordance with claim 12, wherein said polarity inverting means is connected in series with said delay circuit.

15. A variable group delay equalizer in accordance with claim 1, wherein said signal withdrawing means comprises a plurality of branch circuits receiving an input signal from said signal inputting portion and connected with each other in a cascade manner, and delay circuits interposed between said branch circuits.

16. A variable group delay equalizer in accordance with claim 15, wherein said polarity inverting means is interposed between said first synthesizing means and either of the branch circuit for withdrawing said first signal and the branch circuit for withdrawing said second signal.

17. A variable group delay equalizer in accordance with claim 1, wherein said first synthesizing means and said correcting signal producing means comprise a plurality of sets, respectively.

18. An equalizer circuit for use in a communication apparatus in accordance with claim 1, which is used in a transmitting apparatus and/or a receiving apparatus and equalizes an amplitude distortion and group delay distortion caused in a transmit/receive system, and which further comprises a variable amplitude equalizer being able to vary only an amplitude frequency response characteristic in a continuous manner, and said variable group delay equalizer connected to said variable amplitude equalizer in a cascade manner and being able to vary only a group delay frequency characteristic in a continuous manner.

19. An equalizer circuit for use in communcation apparatus being used in a transmitting apparatus and/or a receiving apparatus and for equalizing an amplitude distortion and group delay distortions caused in a transmit/receive system, comprising:

a variable amplitude equalizer means for varying only an amplitude frequency response characteristic substantially independently of delay and in a continuous manner, and a variable group delay equalizer means connected to said variable amplitude equalizer in a cascade manner and operable for varying only a group delay frequency response characteristic substantially independently of amplitude and in a continuous manner.

20. An equalizer in accordance with claim 1, wherein said signal withdrawing means comprising a signal distributor means including a plurality of hybrid circuits combined.

* * * * *